(12) United States Patent
Mori et al.

(10) Patent No.: US 11,870,230 B2
(45) Date of Patent: Jan. 9, 2024

(54) CONNECTION STRUCTURE FOR HOUSING MEMBER AND PROTECTIVE TUBE

(71) Applicant: SUMITOMO WIRING SYSTEMS, LTD., Mie (JP)

(72) Inventors: Hiroki Mori, Mie (JP); Takahiro Murata, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 290 days.

(21) Appl. No.: 17/438,625

(22) PCT Filed: Mar. 19, 2019

(86) PCT No.: PCT/JP2019/011314
§ 371 (c)(1),
(2) Date: Sep. 13, 2021

(87) PCT Pub. No.: WO2020/188725
PCT Pub. Date: Sep. 24, 2020

(65) Prior Publication Data
US 2022/0190570 A1  Jun. 16, 2022

(51) Int. Cl.
*H02G 3/06* (2006.01)
*B60R 16/02* (2006.01)
*H02G 3/04* (2006.01)

(52) U.S. Cl.
CPC ........ *H02G 3/0691* (2013.01); *B60R 16/0215* (2013.01); *H02G 3/0468* (2013.01)

(58) Field of Classification Search
CPC ........ H02G 3/08; H02G 3/081; H02G 3/0468; H02G 3/0691; H02G 3/02; H02G 3/00;
(Continued)

(56) References Cited

U.S. PATENT DOCUMENTS 4,797,512 A * 1/1989 Kumagai ............ B60R 16/0215
174/72 A
7,581,564 B2 * 9/2009 Tanaka .................... F16L 57/00
174/72 A
(Continued)

FOREIGN PATENT DOCUMENTS

DE  202017107503 U1  1/2018
JP  H11-022875 A  1/1999
(Continued)

OTHER PUBLICATIONS

International Search Report dated May 7, 2019 for WO 2020/188725 A1 (3 pages).

*Primary Examiner* — Angel R Estrada
(74) *Attorney, Agent, or Firm* — Venjuris, P.C.

(57) ABSTRACT

An object of the present invention is to reduce the size of a connection structure for a housing member for housing a portion of a wire-shaped transmission member and a protective tube for covering the wire-shaped transmission member. A connection structure for a housing member and a protective tube includes a wire-shaped transmission member, a housing member for housing a first portion which is a portion of the wire-shaped transmission member, and a protective tube for covering a second portion which is another portion of the wire-shaped transmission member. The housing member includes a housing body portion for housing the first portion and an extended portion that protrudes toward the second portion from the housing body portion, and an end portion of the protective tube covers the extended portion.

10 Claims, 4 Drawing Sheets

(58) Field of Classification Search
CPC .. H02G 3/06; H02G 3/04; H05K 5/00; H05K 5/02; H05K 5/021; H05K 5/0247; B60R 16/02; B60R 16/0215
USPC ... 174/50, 481, 559, 68.1, 72 R, 72 A, 74 R, 174/84 R, 88 R, 70 C, 95, 72 C; 248/68.1, 49, 74.1; 16/2.1, 2.2
See application file for complete search history.

(56) References Cited

U.S. PATENT DOCUMENTS

| | | | |
|---|---|---|---|
| 7,692,095 B2 * | 4/2010 | Katsumata | H02G 3/0691 |
| | | | 174/72 A |
| 7,709,736 B2 * | 5/2010 | Irisawa | B60R 16/0215 |
| | | | 174/72 A |
| 7,906,728 B2 * | 3/2011 | Sakata | B60R 16/0215 |
| | | | 174/72 A |
| 7,964,796 B2 * | 6/2011 | Suzuki | H02G 3/0437 |
| | | | 174/72 A |
| 8,847,073 B2 * | 9/2014 | Tokunaga | B60R 16/0215 |
| | | | 174/72 A |
| 10,373,737 B2 | 8/2019 | Takahashi et al. | |
| 2011/0155458 A1 | 6/2011 | Kato et al. | |

FOREIGN PATENT DOCUMENTS

| | | |
|---|---|---|
| JP | H11-069562 A | 3/1999 |
| JP | 2007-321885 A | 12/2007 |
| JP | 2011-239619 A | 11/2011 |

* cited by examiner

US 11,870,230 B2

CONNECTION STRUCTURE FOR HOUSING MEMBER AND PROTECTIVE TUBE

CROSS REFERENCE TO RELATED APPLICATIONS

This application is a national phase of PCT application No. PCT/JP2019/011314, filed on 19 Mar. 2019, the disclosure of which is incorporated herein by reference.

TECHNICAL FIELD

The present invention relates to a technique for connecting a protective tube that covers a wire-shaped transmission member to a housing member for housing the wire-shaped transmission member.

BACKGROUND

In Patent Document 1, a portion of a plurality of coated wires are housed in a grommet. The coated wires are covered with a corrugated tube. The corrugated tube and the grommet are connected to each other by an end portion of the corrugated tube being housed in the grommet.

PRIOR ART DOCUMENT

Patent Document

Patent Document 1: WO 2016/153045 A

SUMMARY OF THE INVENTION

Problems to be Solved

However, in the technique disclosed in Patent Document 1, the end portion of the corrugated tube is housed in the grommet. Accordingly, a portion at which the corrugated tube and the grommet are connected to each other has a diameter larger than the outer diameter of the corrugated tube, and thus increasing the size of the connection structure for the corrugated tube and the grommet.

In view of this, an object of the present invention is to reduce the size of a connection structure for a housing member for housing a portion of a wire-shaped transmission member and a protective tube for covering the wire-shaped transmission member.

Means to Solve the Problem

In order to solve the above-described problem, a connection structure for a housing member and a protective tube according to a first aspect is a connection structure for a housing member and a protective tube, the connection structure including a wire-shaped transmission member, a housing member for housing a first portion which is a portion of the wire-shaped transmission member, and a protective tube for covering a second portion which is another portion of the wire-shaped transmission member, in which the housing member includes a housing body portion for housing the first portion and an extended portion that protrudes toward the second portion from the housing body portion, and an end portion of the protective tube covers the extended portion.

A second aspect is the connection structure for the housing member and the protective tube according to the first aspect, in which a plurality of the recesses are formed in a direction in which the protective tube extends, and a plurality of the positioning protrusions are formed.

A third aspect is the connection structure for the housing member and the protective tube according to the second aspect, in which a plurality of the recesses are formed in a direction in which the protective tube extends, and a plurality of the positioning protrusions are formed.

A fourth aspect is the connection structure for the housing member and the protective tube according to the second or third aspect, in which the recess is an annular recess formed along a circumferential direction of the protective tube, and the positioning protrusion is formed protruding more in a first direction orthogonal to an axial direction of the protective tube than in a second direction orthogonal to the axial direction of the protective tube and the first direction.

A fifth aspect is the connection structure for the housing member and the protective tube according to any one of the first to fourth aspects, in which an opposite-side housing member for housing a third portion of the wire-shaped transmission member located on an opposite side to the first portion with the second portion interposed between the first portion and the third portion, and the protective tube is formed to have a length that reaches the opposite-side housing member in a state in which the protective tube covers the extended portion.

A sixth aspect is the connection structure for the housing member and the protective tube according to any one of the first to fifth aspects, in which the extended portion is provided with a mark indicating an appropriate position of the end portion of the protective tube that covers the extended portion.

A seventh aspect is the connection structure for the housing member and the protective tube according to the sixth aspect, in which a boundary between the housing body portion and the extended portion is the mark.

Effect of the Invention

According to the first aspect, since the end portion of the protective tube covers the extended portion, the connection structure for the housing member and the protective tube can be made smaller.

According to the second aspect, the end portion of the protective tube can be securely connected to the housing member.

According to the third aspect, since the plurality of positioning protrusions fit into the plurality of recesses, the end portion of the protective tube can be securely connected to the housing member.

According to the fourth aspect, the recessed potion is an annular recess formed along the circumferential direction of the protective tube, and the positioning protrusion is formed protruding further in the first direction orthogonal to the axial direction of the protective tube than in the second direction orthogonal to the axial direction of the protective tube, and the first direction, and thus it is possible to readily fit the positioning protrusion into the annular recess while readily covering the end portion of the protective tube the extended portion.

According to the fifth aspect, since the end portion of the protective tube is formed to have a length that covers the extended potion, it is possible to keep the wire-shaped transmission members from being exposed between the protective tube and the housing member.

According to the sixth aspect, since the protective tube covers the extended portion, the end portion of the protective tube can be visually observed. It is possible to confirm whether the protective tube appropriately covers the extended portion based on the positional relationship between the end portion of the protective tube and the mark.

According to the seventh aspect, by confirming whether the protective tube reaches the boundary between the housing body portion and the extend portion, or the positional relationship between the end portion of the protective tube and the boundary, whether the protective tube appropriately covers the extended portion can be confirmed.

DETAILED DESCRIPTION TO EXECUTE THE INVENTION

First Embodiment

Figure 1:
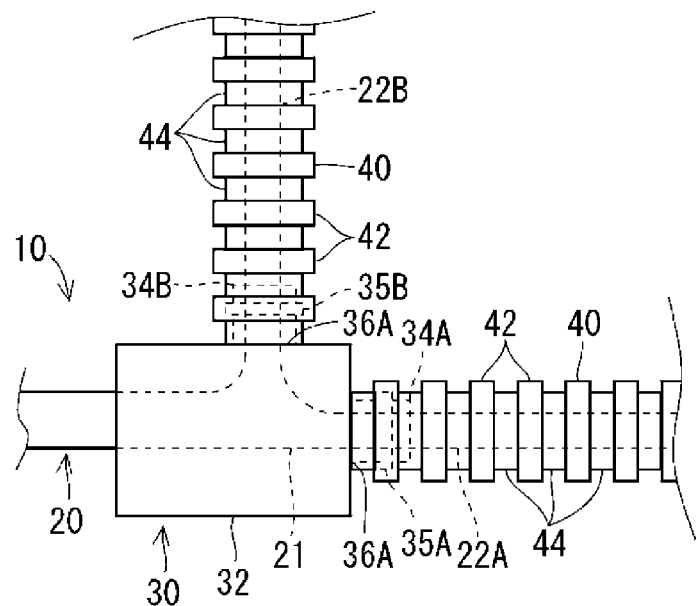
FIG. 1 is a schematic plan view showing a connection structure for a housing member and protective tubes according to a first embodiment.

Hereinafter, a connection structure for a housing member and a protective tube according to a first embodiment will be described. FIG. 1 is a schematic plan view showing a connection structure 10 of a housing member and protective tubes. This connection structure 10 includes a wire-shaped transmission member 20, a housing member 30, and protective tubes 40.

The wire-shaped transmission member 20 may be a wire-shaped member that transmits electricity, light, or the like. For example, the wire-shaped transmission member may be an ordinary wire having a core wire and a coating around the core wire, a bare conductive wire, a shielded wire, a twisted wire, an enamel wire, a nichrome wire, an optical fiber, or the like. As a wire-shaped transmission member for transmitting electricity, the wire-shaped transmission member may also be any of various kinds of signal lines or power lines. Also, the wire-shaped transmission member may be a single wire-shaped member or a composite member (e.g., a twisted wire or a cable formed by collecting a plurality of wire-shaped objects and covering these with a sheath).

Hereinafter, an example in which the wire-shaped transmission member 20 is constituted by wires 20 will be described. The wires 20 are wiring members for electrically connecting electrical components to each other in a vehicle. Here, a plurality of wires 20 are bundled in a form corresponding to wiring routes in the vehicle. For this reason, the connection structure 10 may also be taken as a portion included in a wire harness including the plurality of wires. Here, the wires 20 are bundled while being branched. Note that in the drawings, the wires 20 are shown in bundled form. In this embodiment, the wires 20 are bundled extending in three directions, more specifically, branching in a T-shape. In this embodiment, the branching portion of the wires 20 is a first portion 21, and the two portions extending from the first portion 21 are second portions 22A and 22B.

The housing member 30 is a member for housing the first portion 21 which is a portion of the wires 20. Here, the housing member 30 houses the branching part as the first portion 21 of the wires 20. In other words, the housing member 30 maintains the branching part of the wires 20 in a fixed branching shape. The housing member 30 may also be a water blocking component for keeping water from flowing along the wires 20.

The housing member 30 may also be a resin component formed by metal molding with the first portion 21 of the wires 20 serving as an inserted portion. The housing member 30 may also be a component formed by combining a pair of case-shaped resin components that can house the first portion 21 of the wires 20.

The protective tubes 40 are tubular members that cover the second portions 22A and 22B that are the other portions of the wires 20. Here, a description will be given on the assumption that the protective tubes 40 are corrugated tubes in which large diameter portions 42 and small diameter portions 44 are alternately arranged. Recesses 42g that open toward the inner circumference are formed on the inner side of the large diameter portions 42 of the inner circumferential portion of each protective tube 40. Since the recesses 42g are formed over the entirety in the circumferential direction of the large diameter portions 42, the recesses 42g are annular recesses 42g formed along the circumferential direction of the protective tubes 40. The annular recesses 42g include the end portion of the protective tube 40, and a plurality of annular recesses 42g are formed at intervals over the entirety in the longitudinal direction of the protective tube 40.

The housing member 30 houses the first portion 21 of the wires 20, and the protective tubes 40 cover the second portions 22A and 22B of the wires 20. In this case, in order to protect the wires 20, the housing member 30 and the protective tubes 40 may cover the wires 20 such that the wires 20 are not exposed between the housing member 30 and the protective tube 40. In view of this, the connection structure 10 for the housing member and the protective tube adopts the following configuration.

Figure 2:
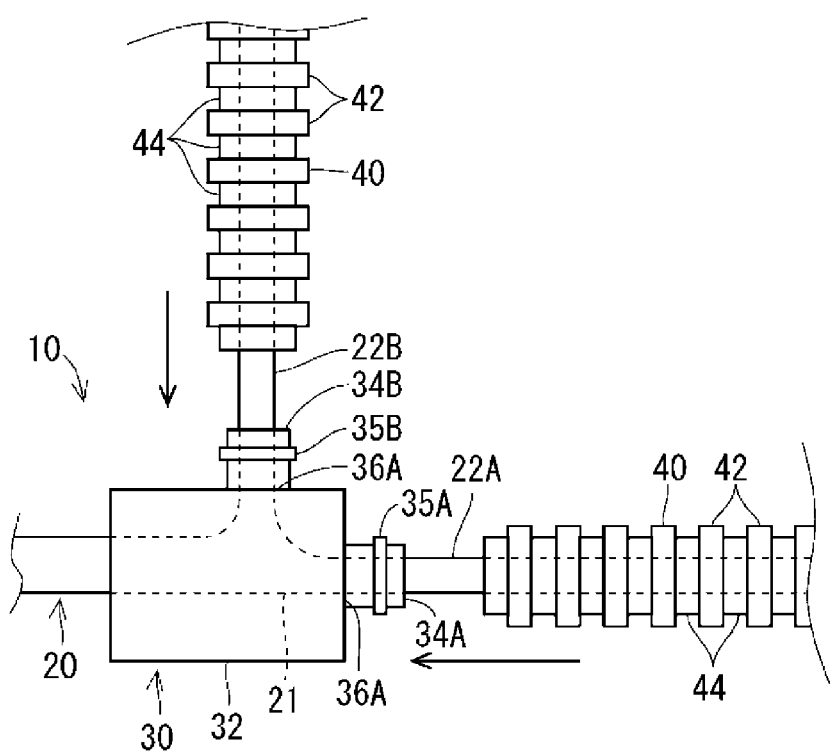
FIG. 2 is an exploded view of a connection structure for a housing member and protective tubes.
Figure 3:
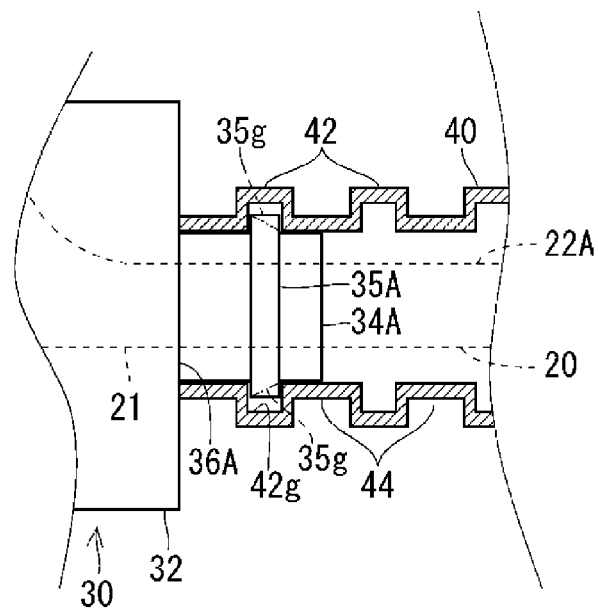
FIG. 3 is a partial cross-sectional view of a connection structure for a housing member and a protective tube.

FIG. 2 is an exploded view of a connection structure 10 for a housing member and protective tubes, and FIG. 3 is a partial cross-sectional view of FIG. 1. The housing member 30 is provided with a housing body portion 32, and extended portions 34A and 34B.

The housing body portion 32 houses the first portion 21 of the wires 20. Here, the housing body portion 32 houses the first portion 21 that is the branching portion of the wires 20. Due to the housing body portion 32, the branching shape of the wires 20 is maintained in a fixed shape and protected. More specifically, the housing body portion 32 is formed in a cuboid shape. The housing body portion 32 does not need to be formed in a cuboid shape, and may also be formed in any other shape. For example, the housing body portion may also have a shape in which recesses or protrusions are formed in a cuboid-shaped portion, or a shape in which planes and curved surfaces are combined. The wires 20 are guided into the housing body portion 32 from one side face side of the housing body portion 32. The first portion 21, which is the branching portion of the wires 20, is housed in the housing body portion 32, and the second portions 22A and 22B, which are branched and extend from the first portion 21, respectively extend outward from another side face and a side face that is adjacent thereto of the housing body portion 32.

The extended portions 34A and 34B are formed protruding from the housing body portion 32 toward the second portions 22A and 22B of the wires 20. Here, the extended portion 34A is formed in a cylindrical shape that protrudes from a side face of the housing body portion 32. The portion of the first portion 21 of the wires 20 that extends from the side face of the housing body portion 32 is housed in the extended portion 34A. The second portion 22A extends outward from the leading end portion of the extended potion 34A. The extended portion 34B is formed in a cylindrical shape that protrudes from another side face of the housing body portion 32. The portion of the first portion 21 of the wires 20 that extends from the other side face of the housing body portion 32 is housed in the extended portion 34B. The second portion 22B extends outward from the leading end portion of the extended portion 34B. The extended portions 34A and 34B may also be formed in a rectangular cylindrical shape.

When it is assumed, for example, that the housing member 30 is a resin member formed by metal molding with the first portion 21 serving as an inserted portion, the extended portions 34A and 34B are assumed to be resin portions formed by metal molding with the first portion 21 serving as the inserted portion, with the housing body portion 32. When it is assumed, for example, that the housing member 30 is a component formed by combining a pair of case-shaped components that can house the first portion 21, the extended portions 34A and 34B are assumed to be semi-cylindrical portions divided along with the housing body portion 32, and portions combined so as to sandwich the first portion 21 therebetween.

The extended portions 34A and 34B have diameters that can be inserted into the end portion of each protective tube 40. Here, the outer diameters of the main body portions of the extended portions 34A and 34B are set smaller than the inner diameter of the protective tubes 40. The protective tubes 40 cover the second portions 22A and 22B of the wires 20 on the leading end side of the extended portions 34A and 34B. Also, the end portions of the protective tubes 40 cover the extended portions 34A and 34B. For this reason, the first portion 21 and the second portion 22A of the wires 20 are covered with the housing member 30 and the protective tubes 40 without being exposed to the outside and protected.

Also, the positioning protrusions 35A and 35B that fit into the annular recesses 42g of the protective tubes 40 are formed in the extended portions 34A and 34B. Here, the positioning protrusions 35A and 35B are formed in an annularly protruding shape that protrudes along the circumferential direction of the extended portions 34A and 34B, and formed between the leading end portion and the base end portion of the extended portions 34A and 34B. The outer diameter of the positioning protrusions 35A and 35B is larger than the minimal inner diameter of the protective tubes 40 and smaller than or equal to the inner diameter of the annular recesses 42g. Also, the thickness of the positioning protrusions 35A and 35B is smaller than or equal to the width (width in the direction along the axial direction of the protective tubes 40) of the annular recesses 42g.

While covering the extended portions 34A and 34B with the end portions of the protective tubes 40 such that the extended portions 34A and 34B are pressed into the end portions of the protective tubes 40, the positioning protrusions 35A and 35B are fitted into the annular recesses 42g of the end portions of the protective tubes 40. In this manner, the protective tubes 40 become unlikely to come out of the extended portions 34A and 34B. The positioning protrusions 35A and 35B may also be omitted. As a variation of the positioning protrusions 35A and 35B, inclined surfaces 35g (see the two-dot-chain lines in FIG. 3) may also be provided. These inclined surfaces 35g are portions that make it easy for the protective tubes 40 to be externally fitted. For example, the inclined surface 35g may be formed on the outer surface of the positioning protrusion 35A and may inwardly incline toward the leading end of the extended portion 34A. In this manner, when the protective tube 40 is externally fitted to the extended portion 34A, the protective tube 40 abuts against the inclined surface 35g and is smoothly guided toward the base end side of the extended portion 34A. This makes it easier for the protective tube 40 to be externally fitted to the extended portion 34A. Also, in the state in which the protective tube 40 covers the extended portion 34A, the base end side portion of the extended portion 34A of the positioning protrusion 35A is fitted into the annular recess 42g, and thus the protective tube 40 is unlikely to come out of the extended portion 34A.

According to the connection structure 10 for the housing member and the protective tube with this configuration, since the end portions of the protective tubes 40 cover the extended portion 34A and 34B, it is possible to keep the wires 20 from being exposed to the outside between the protective tubes 40 and the housing member 30 and protect the wires 20. Also, the diameter of the connection structure 10 can be similar to the diameter of the protective tubes 40, and thus the connection structure 10 can be made smaller.

Also, the protective tubes 40 cover the extended portions 34A and 34B and the end portions of the protective tubes 40 can be visually observed from the outside. For this reason, whether and the extent to which the protective tubes 40 cover the extended portions 34A and 34B can be easily confirmed.

Also, since the positioning protrusions 35A and 35B cover the annular recesses 42g, the end portions of the protective tubes 40 can be securely connected to the housing member 30. Since the positioning protrusions 35A and 34B are formed in an annular shape, and the entirety thereof in the circumferential direction is fitted into the annular recesses 42g, the end portions of the protective tubes 40 can be more securely connected to the housing member 30. For this reason, there is no need to separately fix the end portions of the protective tubes 40 with tape, belt, or the like, and fix the other end portions of the protective tubes 40 to the connectors or the like on the other side, thus making it possible to simplify the configuration and facilitate the assembly, for example.

Also, since the protective tubes 40 cover the extended portions 34A and 34B, even if the positioning protrusions 35A and 35B come out of the annular recesses 42g due to vibrations or the like, the protective tubes 40 keep covering the extended portions 34A and 34B, and the wires 20 are kept from being exposed to the outside.

Variations based on the above-described first embodiment will be described next.

Figure 4:
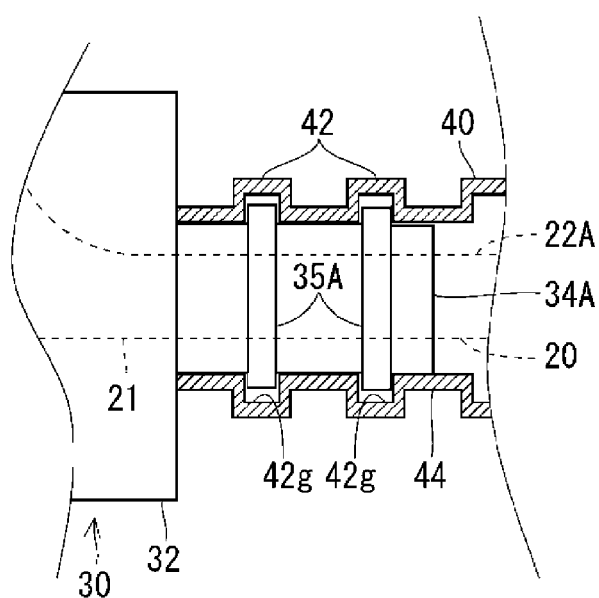
FIG. 4 is a partial cross-sectional view showing a connection structure for a housing member and a protective tube according to a first variation.

FIG. 4 is a partial cross-sectional view showing a first variation. As shown in FIG. 4, the positioning protrusions 35A are formed at multiple (two in this variation) locations in the direction in which the protective tube 40 extends. The positioning protrusions 35A are arranged at a pitch corresponding the pitch of the annular recesses 42g formed on the inner circumferential side of the protective tube 40. For this reason, the positioning protrusions 35A are respectively fitted into the multiple annular recesses 42g of the protective tube 40.

According to this first variation, since a plurality of the positioning protrusions 35A fit into the plurality of annular recesses 42g, the end portion of the protective tube 40 can be more securely connected to the housing member 30.

Figure 5:
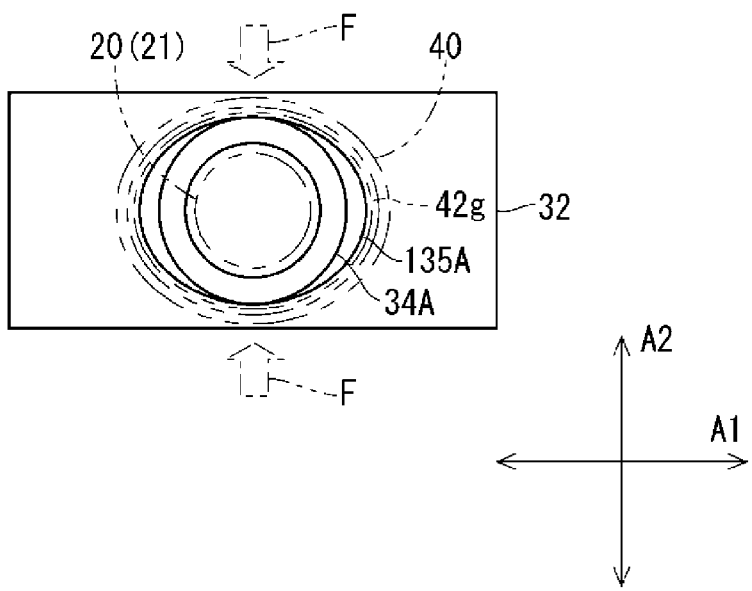
FIG. 5 is a partial enlarged view showing a connection structure for a housing member and a protective tube according to a second variation.
Figure 6:
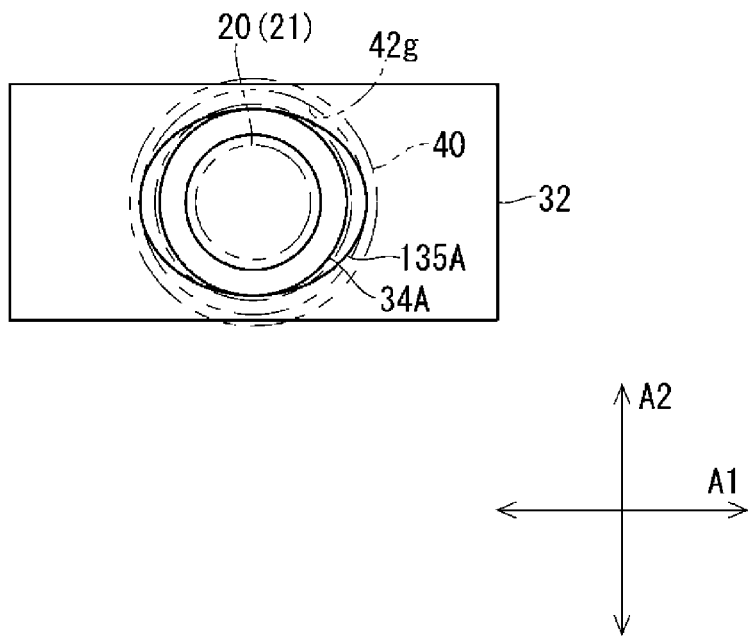
FIG. 6 is a partial enlarged view showing the connection structure for the housing member and the protective tube according to the second variation.

FIG. 5 and FIG. 6 are partial enlarged views showing a second variation. FIG. 5 and FIG. 6 are diagrams of the extended portion 34A as seen from the leading end side. FIG. 5 shows a state where the end portion of the protective tube 40 partway covers the extended portion 34A, and FIG. 6 shows a state where the end portion of the protective tube 40 has covered the extended portion 34A.

In the second variation, a positioning protrusion 135A is formed instead of the positioning protrusion 35A. The positioning protrusion 135A is formed protruding more in a first direction A1 orthogonal to the axial direction of the protective tube 40 than in a second direction A2 orthogonal to the axial direction of the protective tube 40 and the first direction A1.

Here, the positioning protrusion 135A is formed protruding in an ellipsoidal shape along the circumferential direction of the extended portion 34A. The long axis direction of the positioning protrusion 135A matches the first direction A1, and accordingly, the positioning protrusion 135A protrudes the most in the first direction A1. The short axis direction of the positioning protrusion 135A matches the second direction A2, and accordingly, the positioning protrusion 135A does not protrude or the protrudes the least in the second direction A2. The positioning protrusion need not necessarily be formed in an ellipsoidal shape. The outer shape of the positioning protrusion need not necessarily be an arched shape. The positioning protrusion is, for example, formed in a shape partially protruding in a rectangular shape in the circumferential direction of the extended portion 34A.

According to the second variation, if a force F acting in the second direction is applied to the end portion of the protective tube 40 to deform the end portion into an elliptical shape that is elongated in the first direction A1, the positioning protrusion 135A readily passes a portion on the opening side of the annular recess 42g of the end portion of the protective tube 40 and fits into the annular recess 42g (see FIG. 5). If this force F is cancelled, the end portion of the protective tube 40 restores to its original shape, and the positioning protrusion 135A fits into the annular recess 42g (see FIG. 6). For this reason, it is possible to easily fit the positioning protrusion 135A into the annular recess 42g while easily covering the extended portion 34A with the end portion of the protective tube 40.

Figure 7:
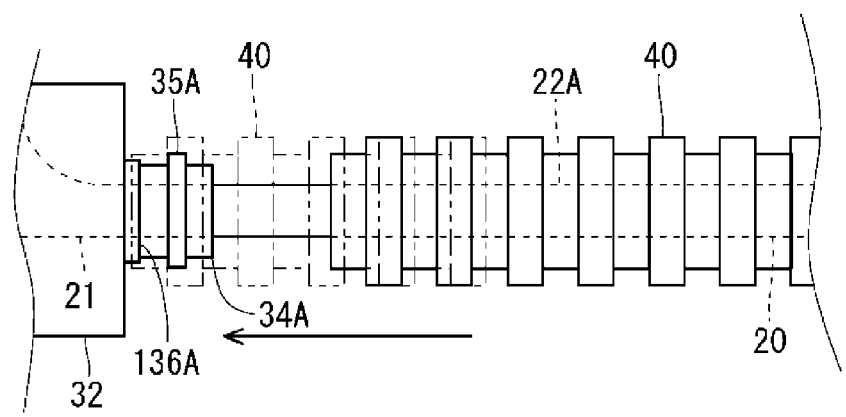
FIG. 7 is a partial enlarged view showing a connection structure for a housing member and a protective tube according to a third variation.

FIG. 7 is a partial enlarged view showing a third variation. In this variation, a mark 136A indicating an appropriate position of the protective tube 40 that is to cover the extended portion 34A. Here, a protrusion that annually protrudes from the main body portion of the extended portion 34A is formed at the base end portion of the extended portion 34A, and a level difference on the leading end side of this protrusion is the mark 136A. The protruding size of this protrusion is smaller than the protruding size of the positioning protrusion 35A, and thus the end portion of the protective tube 40 can cover the portion at which the mark 136A is provided.

When covering the extended portion 34A with the protective tube 40, the relative positional relationship between the end portion of the protective tube 40 and the mark 136A can be visually confirmed, ensuring that the end portion of the protective tube 40 exceeds the mark 136A. In this manner, it is possible to confirm whether the protective tube 40 securely covers the extended portion 34A, that is, whether the positioning protrusion 35A covers the extended portion 34A and fits into the annular recess 42g. In other words, since the protective tube 40 covers the extended portion 34A, the end portion of the protective tube 40 can be visually confirmed. Also, whether the protective tube 40 appropriately covers the extended portion 34A can be confirmed based on the positional relationship between the end portion of the protective tube 40 and the mark 136A.

In this variation, a protrusion is formed at the extended portion 34A, and a level difference of the protrusion forms the mark 136A. In the above-described first embodiment as well, by setting the boundary between the housing body portion 32 and the extended portion 34A as the mark 36A and confirming the positional relationship between the end portion of the protective tube 40 and the mark 36A, it is possible to whether the protective tube 40 appropriately covers the extended portion 34A. It may also be determined that the protective tube 40 appropriately covers the extended portion 34A if the end portion of the protective tube 40 reaches the mark 36A, for example, in other words, if the end portion is in contact with the housing body portion 32. It may also be determined that the protective tube 40 appropriately covers the extended portion 34A if the distance between the end portion of the protective tube 40 and the mark 36A is a predetermined length or less.

In the above-described first embodiment, the housing member 30 need not necessarily house the branching portion of the plurality of wires 20. The housing member may also house intermediate portions, in the direction in which the wires extend, of the wires, or the end portions of the wires.

Figure 8:
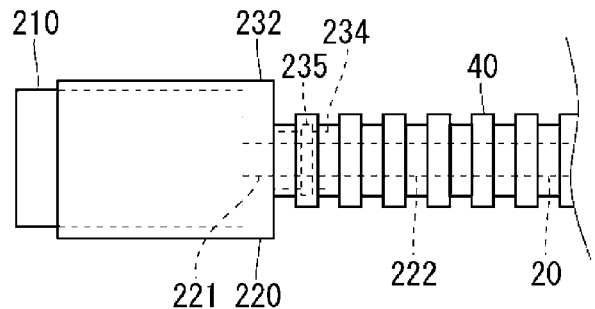
FIG. 8 is a schematic plan view showing a connection structure for a housing member and a protective tube according to a fourth variation.

In a fourth variation shown in FIG. 8, for example, a connector cover 220 covers the base end portion of a connector 210. A terminal is connected to the end portions of the wires 20, and the terminal is held in a cavity of the connector 210. The wires 20 extend outward from the base end portion of the connector 210. Since the connector cover 220 covers a first portion 221 of the wires 20 that includes a portion inside the connector 210 and a portion that extends from the base end of the connector 210, the connector cover 220 is an example of a housing member.

The connector cover 220 is a member provided with a housing body portion 232 and an extended portion 234, and a part formed by metal-molding resin or the like, for example. The connector cover 220 may be a part molded in one piece, or a part formed by combining a pair of resin parts formed in a case-like shape. The connector cover 220 may also be formed by an elastic material such as rubber.

The housing body portion 232 houses the first portion 221, which is an end portion of the wires 20 with the connector 210. The extended portion 234 is a tubular portion that extends from the base end portion of the housing body portion 232, and houses the first portion 221 of the wires 20, which extends from the base end portion of the housing body portion 232. A portion of the wires 20 that extends from the extended portion 234 is a second portion 222.

A positioning protrusion 235 may also be formed at the extended portion 234 similarly to the positioning protrusion 35A of the first embodiment. FIG. 8 shows an example in which the positioning protrusion 235 is formed.

Furthermore, the end portion of the protective tube 40 covers the extended portion 234 similarly to the above-described first embodiment. Also, the positioning protrusion 235 fits into the annular recess 42g of the protective tube 40.

With this variation as well, the operation and effects similar to that of the first embodiment can be obtained.

Second Embodiment

Figure 9:
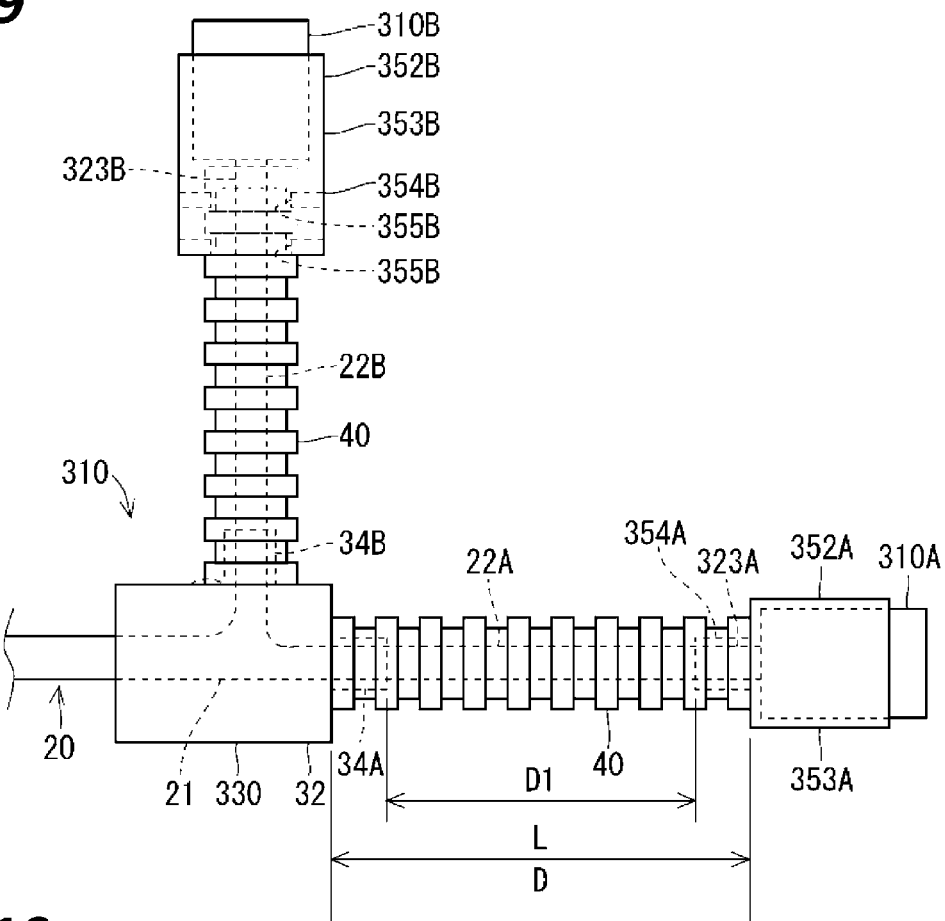
FIG. 9 is a schematic plan view showing a connection structure for a housing member and protective tubes according to a second embodiment.

Hereinafter, a connection structure for a housing member and a protective tube according to a second embodiment will be described. FIG. 9 is a schematic plan view showing a connection structure 310 for a housing member and protective tubes. This connection structure 310 is provided with a wire-shaped transmission members 20, a housing member 330, protective tubes 40, and connector covers 352A and 352B as opposite-side housing members.

The configuration of the wire-shaped transmission member 20 and the protective tubes 40 is similar to that described in the above-described first embodiment.

The housing member 330 is provided with a housing body portion 32 and extended portions 34A and 34B similarly to the housing member 30 described in the first embodiment. In the housing member 330, the positioning protrusion may or may not be formed at the extended portions 34A and 34B. FIG. 9 shows an example in which the positioning protrusion is not formed.

A second portion 22A of the wires 20 extends from the extended portion 34A. In the wires 20, a third portion 323A is present on the opposite side to a first portion 21 with the second portion 22A interposed therebetween. Here, the third portion 323A is the end portion of the wires 20.

A connector 310A is connected to the end portion of the wires 20. A connector cover 352A covers the base end portion of this connector 310A. In other words, a terminal is connected to the end portion of the wires 20, and the terminal is held in a cavity of the connector 310A. The wires 20 extend outward from the base end portion of the connector 310A. Since the connector cover 352A covers a third portion 323A of the wires 20 that includes a portion inside the connector 210 and a portion that extends from the base end of the connector 210, the connector cover 352A is an example of an opposite-side housing member.

The connector cover 352A is a member provided with a housing body portion 353A and an extended portion 354A, and a part formed by metal-molding resin or the like, for example. The connector cover 352A may be a part molded in one piece, or a part formed by combining a pair of resin parts formed in a case-like shape. The connector cover 352A may also be formed by an elastic material such as rubber.

The housing body portion 353A houses the third portion 323A that is an end portion of the wires 20 with the connector 310A. The extended portion 354A is a tubular portion that extends from the base end portion of the housing body portion 353A, and houses the third portion 323A of the wires 20 that extends from the base end portion of the housing body portion 353A. A portion of the wires 20 located between the 34A and the extended portion 354A is a second portion 22A.

A positioning protrusion may or may not be formed at the extended portion 354A. FIG. 9 shows an example in which a positioning protrusion is not formed.

The protective tube 40 has a length that reaches the connector cover 352A in a state in which it covers the extended portion 34A. Here, the state in which "the protective tube 40 reaches the connector cover 352A" may also be regarded as a case in which "the end portion of the protective tube 40 is in contact with the connector cover 352A in a state in which the movement of the end portion of the protective tube 40 toward the connector cover 352A is restricted". Here, a length L of the protective tube 40 is set larger than the distance D1 between the extended portion 34A and the extended portion 354A, and to a length equal to a distance D between the housing body portion 32 and the housing body portion 353A. The length L of the protective tube 40 may also be set larger than the distance D between the housing body portion 32 and the housing body portion 353A, and the protective tube 40 may also be arranged in a compressed state between the housing body portion 32 and the housing body portion 353A.

Also, a second portion 22B of the wires 20 extends from the extended portion 34B. In the wires 20, a third portion 323B is present on the opposite side to the first portion 21 with the second portion 22B interposed therebetween. Here, the third portion 323B is an end portion of the wires 20.

A connector 310B is connected to an end portion of the wires 20. The connector cover 352B covers the base end portion of this connector 310B. In other words, a terminal is connected to the end portion of the wires 20, and the terminal is held in a cavity of the connector 310B. The wires 20 extend outward from the base end portion of the connector 310B. Since the connector cover 352B covers the third portion 323B of the wires 20, which includes a portion of the connector 210, and a portion that extends from the base end of the connector 210, the connector cover 352B is an example of the opposite-side housing member.

The connector cover 352B is a member provided with a housing body portion 353B and a holding portion 354B, and a part formed by metal-molding resin or the like, for example. The connector cover 352B may be a member molded in one piece, or a part formed by combining a pair of resin parts formed in a case-like shape. The connector cover 352B may also be formed by an elastic material such as rubber.

The housing body portion 353B houses the third portion 323B, which is an end portion of the wires 20, with the connector 310B. A holding portion 354B is a tubular portion that extends from the base end portion of the housing body portion 353B. The holding portion 354B has a shape that can house the other end portion of the protective tube 40, and a tube positioning protrusion 355B that fits into the annular recess at the other end portion of the protective tube 40 is formed at the inner circumferential portion. The holding portion 354B houses the third portion 323B that extends from the base end portion of the housing body portion 353B of the wires 20, as well as the other end portion of the protective tube 40. The connector cover 352B may also have a configuration in which two divided parts are joined together in a state of pinching and fixing the connector 310B and the other end portion of the protective tube 40 therebetween. The portion of the wires 20 that is located between the above extended portion 34B and the holding portion 354B is a second portion 22B.

The protective tube 40 has a length that reaches the connector cover 352B in a state in which it covers the extended portion 34B. The state in which "the protective tube 40 reaches the connector cover 352B" may also be regarded as a case in which "the end portion of the protective tube 40 is in contact with the connector cover 352B in a state in which the movement of the end portion of the protective tube 40 toward the connector cover 352B is restricted". Here, the other end portion of the protective tube 40 is held in a state in which it is positioned by the holding portion 354B. The length of the protective tube 40 is set to the length that can cover the extended portion 34B, based on the position at which the other end portion of the protective tube 40 is positioned by the holding portion 354B. The protective tube 40 may also be set to a length that comes in contact with the housing body portion 32. The protective tube 40 may also be set to a length that reaches the housing body portion 32 and be arranged in a state in which it is compressed between the holding portion 354B and the housing body portion 32.

According to the second embodiment, since the end portions of the protective tubes 40 cover the extended portion 34A and 34B, the wires 20 can be kept from being exposed to the outside between the protective tubes 40 and the housing member 30 and protected. Also, the diameter of the connection structure 310 can be similar to that of the protective tube 40, and thus the connection structure 310 can be made smaller.

Furthermore, since the protective tubes 40 have a length that can cover the regions extending from the connector covers 352A and 352B, which are the opposite-side housing members, to the extended portions 34A and 34B, respectively, the wires 20 can be kept from being exposed between the protective tubes 40 and the housing member 330. Furthermore, even if positioning protrusions are not formed at the extended portions 34A and 34B of the housing member 330, the wires 20 are held in which the wires 20 cover the extended portions 34A and 34B, and thus it is possible to simplify the configuration and facilitate the assembly.

At the opposite-side housing members, a configuration is also possible in which the other end portion of the protective tube 40 is not fixed to a constant position and the end portion is merely restricted not to move toward the opening as in the connector cover 352A. A configuration is also possible in which the other end portion of the protective tube 40 is positioned as in the connector cover 352B.

Note that the connector cover 352A may also be regarded as a housing member and the housing member 330 may be regarded as an opposite-side housing member. In this case, even if the positioning protrusion 35A is formed at the extended portion 34A, if the positioning protrusion is not formed on the connector cover 352A side, it is possible to simplify the configuration and facilitate the assembly.

Also, if a configuration is adopted in which the protective tube 40 is arranged between the housing member 330 and the opposite-side housing member in a state in which it is compressed, the wires 20 are unlikely to be exposed even if vibrations or the like occur.

In the second embodiment, the marks 36A and 136A may also be provided similarly to the first embodiment. In this manner, it is possible to confirm whether the protective tube 40 has a sufficient length that can cover the extended portion 34A.

Variations

In the above-described embodiments and variations, the protective tubes 40 need not necessarily be corrugated tubes. The protective tubes 40 may also be formed in a tubular shape in which portions having the same diameter are continuous with each other. In this case, it is favorable that recesses that open toward the inner circumference are formed at the end portions of the protective tubes, so that the positioning protrusions formed at the extended portions can be fitted into the end portion of the protective tubes. In this case, the recesses may also be annular grooves formed in the entirety in the circumferential direction of the inner circumferential portions of the end portions of the protective tubes. In this case, the positioning protrusions may also be protrusions formed at the entirety in the circumferential direction of the extended portions, or protrusions formed at the extended portions partially in the circumferential direction. Furthermore, the recesses may also be recesses formed in the inner circumferential portion of the end portions of the protective tubes, partially in the circumferential direction, or through holes. In this case, the protrusions may also be protrusions formed at the inner circumferential portions of the end portions of the protective tubes partially in the circumferential direction.

The connector cover described in the embodiments and variations may also be a portion molded in one piece with the connector.

Figure 10:
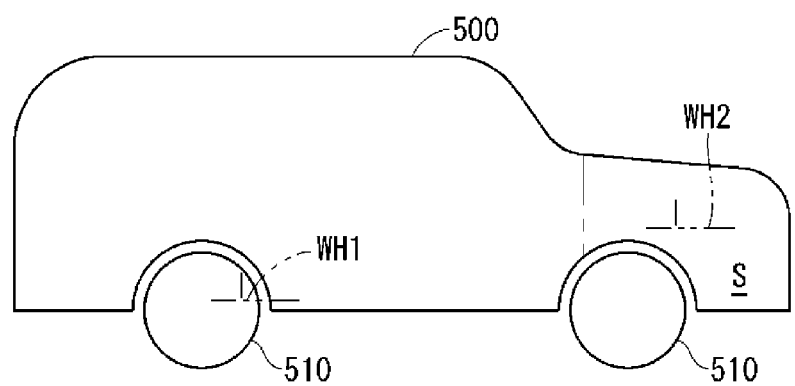
FIG. 10 is an illustrative diagram showing a state in which a connection structure for a housing member and a protective tube has been attached to a vehicle.

FIG. 10 is a diagram showing an example in which wire harnesses WH1 and WH2 including the above-described connection structures 10 and 310 for the housing member and the protective tube are attached to a vehicle.

The wire harness WH1 can be attached to a vehicle as a wiring member for connecting a vehicle body 500 and wheels 510, for example. The wire harnesses for the wheels need to be arranged in narrow spaces between wheel housings and the wheels 510. Furthermore, since the wire harnesses are arranged in the surroundings of the wheels, relatively high protection is required. Since the connection structures 10 and 310 have a configuration that can achieve reduction in size of the connection structures 10 and 310 while suppressing exposure of the wires 20 between the protective tube 40 and the housing members 30 and 330, the connection structures 10 and 310 are suitable for use as the wire harness WH1 for connecting the vehicle body 500 and the wheels 510 to each other.

Furthermore, the wire harness WH2 is located forward of the vehicle cabin of the vehicle, for example, and can be attached as a wiring member arranged in a space S that is separated from the outside. In vehicles provided with an internal combustion, the space S is a space referred to as an engine room, and in electric cars, the space S is a space in which an electric motor may be arranged. The space S may also be taken as a space S in which a power generator such as an internal combustion and an electric motor is arranged. Since the space S is an environment that is likely to vibrate due to the internal combustion or the electric motor, vibration is also applied to the wiring member arranged in the space S.

If the wire harness WH2 including the connection structure 10 is arranged in the space S, since the positioning protrusions 35A and 35B of the extended portions 34A and 34B fit into the annular recesses 42g of the protective tubes 40, the protective tubes 40 and the housing member 30 move in one piece, and the extended portions 34A and 34B are unlikely to come out of the protective tubes 40. For this reason, there is no need to increase a holding force for holding the extended portions 34A and 34B and the end portion of the protective tubes 40, thus making it possible to simplify the configuration.

Furthermore, if the wire harness WH2 including the connection structure 310 is arranged in the space S, the protective tubes 40 are arranged between the housing member 330 and the connector covers 352A and 352B and cover the extended portions 34A and 34B. For this reason, even if the wire harness WH2 vibrates, in the portions at which the protective tubes 40 cover the extended portions 34A and 34B, even if the protective tube 40 displaces, exposure of the wires 20 can be suppressed. Accordingly, even in a vibration environment, the wires 20 can be sufficiently protected with a simple configuration.

Note that the configuration described in the embodiments and variations can be appropriately combined with each other as long as no contradictions arise. For example, in one wire harness, a configuration in which the protective tubes are held by the positioning protrusion with respect to the extended portion as in the first embodiment, and a configuration in which the protective tubes are provided between the housing member and the opposite-side housing members as in the second embodiment may also be adopted at the same time.

Although the present invention was described in detail as above, the above description is exemplary in all aspects, and should not be construed as limiting thereto. It should be construed that uncounted variations that have not been exemplified are conceivable without departing from the scope of the present invention.

LIST OF REFERENCE NUMERALS

10, 310 Connection structure for housing member and protective tube
20 Wire-shaped transmission member (wire)
21, 221 First portion
22A, 22B, 222 Second portion
30, 330 Housing member
32, 232, 353A, 353B Housing body portion
34A, 34B, 234, 354A Extended portion
35A, 35B, 135A, 235 Positioning protrusion
36A, 136A Mark
40 Protective tube
42*g* Annular recess
210, 310A, 310B Connector
220, 352A, 352B Connector cover
323A, 323B Third portion
354B Holding portion
355B Tube positioning protrusion
A1 First direction
A2 Second direction

What is claimed is:

1. A connection structure for a housing member and a protective tube, the connection structure comprising:
    a wire-shaped transmission member;
    a housing member for housing a first portion which is a portion of the wire-shaped transmission member; and
    a protective tube for covering a second portion which is another portion of the wire-shaped transmission member,
    wherein the housing member includes:
        a housing body portion that is a member that maintains a branching portion of a plurality of wire-shaped transmission members in a fixed branching shape and for housing the first portion, and
        an extended portion that protrudes toward the second portion from the housing body portion,
    an end portion of the protective tube covers the extended portion,
    the housing body portion is formed in a cuboid shape that houses the branching portion of the plurality of wire-shaped transmission members, as the first portion, and the branching shape of the plurality of wire-shaped transmission members is maintained in the fixed shape and protected in the cuboid-shaped housing body portion, and
    the extended portion extends from the side face of the housing body portion.

2. The connection structure for the housing member and the protective tube according to claim 1,
    wherein a recess that opens toward the inner circumference is formed in an end portion of the protective tube, and
    a positioning protrusion that fits into the recess is formed at the extended portion.

3. The connection structure for the housing member and the protective tube according to claim 2,
    wherein a plurality of the recesses are formed in a direction in which the protective tube extends, and
    a plurality of the positioning protrusions are formed.

4. The connection structure for the housing member and the protective tube according to claim 2,
    wherein the recess is an annular recess formed along a circumferential direction of the protective tube, and
    the positioning protrusion is formed protruding more in a first direction orthogonal to an axial direction of the protective tube than in a second direction orthogonal to the axial direction of the protective tube and the first direction.

5. The connection structure for the housing member and the protective tube according to claim 1, further comprising
    an opposite-side housing member for housing a third portion of the wire-shaped transmission member located on an opposite side to the first portion with the second portion interposed between the first portion and the third portion,
    wherein the protective tube is formed to have a length that reaches the opposite-side housing member in a state in which the protective tube covers the extended portion.

6. The connection structure for the housing member and the protective tube according to claim 1,
    wherein the extended portion is provided with a mark indicating an appropriate position of the end portion of the protective tube that covers the extended portion.

7. The connection structure for the housing member and the protective tube according to claim 6,
    wherein a boundary between the housing body portion and the extended portion is the mark.

8. The connection structure for the housing member and the protective tube according to claim 1,
    wherein the extended portion extends from one main surface of the housing body portion, and the end portion of the protective tube is in contact with the one main surface of the housing body portion.

9. A connection structure for a housing member and a protective tube, the connection structure comprising:
    a wire-shaped transmission member;
    a housing member for housing a first portion which is a portion of the wire-shaped transmission member; and
    a protective tube for covering a second portion which is another portion of the wire-shaped transmission member,
    wherein the housing member includes:
        a housing body portion that is a member that maintains a branching portion of a plurality of wire-shaped transmission members in a fixed branching shape or a connector cover for covering a connector provided at end portions of the wire-shaped transmission members and for housing the first portion, and
        an extended portion that protrudes toward the second portion from the housing body portion, the housing member is a resin component formed by metal molding with the first portion serving as an inserted portion, and an end portion of the protective tube covers the extended portion.

10. A connection structure for a housing member and a protective tube, the connection structure comprising:

a wire-shaped transmission member;

a housing member for housing a first portion which is a portion of the wire-shaped transmission member; and a protective tube for covering a second portion which is another portion of the wire-shaped transmission member, wherein the housing member includes:

a housing body portion that is a connector cover for covering a connector provided at an end portion of the wire-shaped transmission member and for housing the first portion, and an extended portion that protrudes toward the second portion from the housing body portion, and an end portion of the protective tube covers the extended portion.

* * * * *